United States Patent
Shedletsky et al.

(10) Patent No.: US 11,690,018 B2
(45) Date of Patent: Jun. 27, 2023

(54) SYSTEMS AND METHODS FOR POWER CONSUMPTION MANAGEMENT

(71) Applicant: Apple Inc., Cupertino, CA (US)

(72) Inventors: Anna-Katrina Shedletsky, Mountain View, CA (US); Fletcher R. Rothkopf, Cupertino, CA (US); Samuel Bruce Weiss, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 162 days.

(21) Appl. No.: 17/369,761

(22) Filed: Jul. 7, 2021

(65) Prior Publication Data
US 2021/0337480 A1 Oct. 28, 2021

Related U.S. Application Data

(63) Continuation of application No. 15/025,232, filed as application No. PCT/US2013/062473 on Sep. 27, 2013, now Pat. No. 11,082,927.

(51) Int. Cl.
*H04W 52/02* (2009.01)
*H04M 1/724* (2021.01)
*H04M 1/72451* (2021.01)

(52) U.S. Cl.
CPC ....... *H04W 52/0258* (2013.01); *H04M 1/724* (2021.01); *H04M 1/72451* (2021.01); *H04W 52/0264* (2013.01); *Y02D 30/70* (2020.08)

(58) Field of Classification Search
CPC ......... H04W 52/0258; H04W 52/0264; H04M 1/724; H04M 1/72451; Y02D 30/70
See application file for complete search history.

(56) References Cited

U.S. PATENT DOCUMENTS

| | | | |
|---|---|---|---|
| 2008/0201587 A1* | 8/2008 | Lee | H04W 52/0261 713/320 |
| 2008/0261662 A1* | 10/2008 | Ashbrook | H04M 1/724 455/566 |
| 2010/0145643 A1* | 6/2010 | Katpelly | H04W 52/0264 702/63 |
| 2012/0047379 A1* | 2/2012 | Chen | G06F 1/26 713/320 |
| 2012/0210150 A1* | 8/2012 | de Lind van Wijngaarden | G06F 9/4893 713/320 |

(Continued)

FOREIGN PATENT DOCUMENTS

GB 2448534 10/2008

OTHER PUBLICATIONS

International Search Report and Written Opinion, PCT/US2013/062473, 11 pages, dated Jun. 5, 2014.

*Primary Examiner* — Ankur Jain
(74) *Attorney, Agent, or Firm* — Brownstein Hyatt Farber Schreck, LLP (57) ABSTRACT

A power source is configured to supply power to one or more components of an electronic device. A processing device that is in communication with the power source can be configured to determine an estimated power requirement of the mobile electronic device during a time period, to determine a charge state of the power source, and to produce an indication of the remaining use time of the electronic device based on the estimated power requirement and the charge state of the power source.

20 Claims, 5 Drawing Sheets

(56) References Cited

U.S. PATENT DOCUMENTS

2012/0210325 A1\* 8/2012 de Lind van Wijngaarden .......... H04W 52/0258 718/103
2013/0225147 A1\* 8/2013 Musial .................... H04W 4/16 455/418

\* cited by examiner

SYSTEMS AND METHODS FOR POWER CONSUMPTION MANAGEMENT

CROSS-REFERENCE TO RELATED APPLICATION(S)

This application is a continuation patent application of U.S. patent application Ser. No. 15/025,232, Mar. 25, 2016 and titled "Displaying Use Time Remaining on Fast Charge Devices," which is a 35 U.S.C. § 371 application of PCT/US2013/062473, filed on Sep. 27, 2013 and titled "Displaying Use Time Remaining on Fast Charge Devices," the disclosures of which are hereby incorporated herein by reference in their entireties.

FIELD

The present invention relates generally to electronic devices and, more specifically to power management for electronic devices. Still more particular, the present invention relates to displaying the remaining use time of a portable power source in an electronic device.

BACKGROUND

Most electronic devices include an internal portable power source, such as a rechargeable battery, that provides power to the devices. One technique for informing a user about the amount of charge on the power source is to represent the amount of charge in as a battery charge status icon. The amount of charge on the power source can be represented by a color indicator that completely fills or partially fills in the icon. For example, when the power source is fully charged, the battery icon can be filled in completely by the color indicator. The battery icon, however, may not provide information to the user about whether or not the power source has a sufficient amount of charge to power the device for the applications and functions the user will be running over an upcoming period of time. For example, the user may be running a navigation program to receive turn-by-turn directions for two hours, which means the electronic device will be in near-constant or constant use during that two hour period. Based on the battery icon, the user may not be able to determine that the power source has a sufficient amount of charge to provide power for that application for the entire two hours. In general, some users can be anxious or uncertain about the displayed amount of charge remaining on a power source because the user may not be certain that the remaining charge is sufficient to meet the user's use of the electronic device over an upcoming period of time.

SUMMARY

Embodiments described herein can learn how a user uses an electronic device and provide more accurate information about the remaining use time of the electronic device to the user. In some embodiments, a fast charging battery or power source can be included in the electronic device. In one aspect, an electronic device includes a power source configured to supply power to one or more components of the electronic device. A processing device that is in communication with the power source can be configured to determine an estimated power requirement of the mobile electronic device during a time period and determine a charge state of the power source. The processing device can be adapted to determine if the charge on the power source will meet the estimated power requirement, and to produce an indication as to the remaining use time for the electronic device. The remaining use time can be determined independently for one or more users of the electronic device, and the indication can be displayed to each user in several different ways. For example, in one embodiment, the processing device can determine that having 50% charge on the power source provides a first user with twenty-four hours of use but provides a second heavier user with twelve hours of use. The appropriate amount of remaining use time can be displayed to each respective user.

In another aspect, a method for operating an electronic device can include a processing device estimating a power requirement to be needed in an upcoming time period and determining an amount of charge on a power source of the electronic device. An indication of the amount of time a user has to use the electronic device can then be displayed to the user. The displayed remaining use time can be updated continuously, periodically, or at select times. The amount of use time can be learned by the electronic device. Additionally or alternatively, a user can enter desired or expected use times for one or more applications and the electronic device can utilize the user-input information to determine the amount of use time remaining. The amount of use time remaining can be determined using data from one or more sensors, such as GPS, applications, such as a calendar and/or navigation or location service or application, and/or from one or more network connections or configurations, such as an IP address.

In yet another aspect, one or more power profiles can be created for the portable electronic device. A power profile can include estimated power requirements, historical power usage, and/or options regarding the power management of the portable electronic device. A method for creating a power profile can include a processing device analyzing historical power requirements of the electronic device and creating the power profile based on the determined historical power requirements. The power profile can be modified based on input received from a user.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein can estimate or predict the remaining use time for an electronic device for an upcoming period of time. Information about the estimated power requirements and the remaining power on a power source can be analyzed and the remaining use time can be displayed to the user in a more meaningful display. The portable electronic device can sample data regarding power usage over time to create a database of power use data, or the mobile electronic device may have a "test" time such as a number of days or a week during which the device may store data corresponding to the "typical" power consumption.

Embodiments can provide an indication of how much use time remains for one or more users of the electronic device based on a power profile the device has created or received. The power profile can include estimated power requirements, historical power usage, and/or options regarding the power management of the portable electronic device. For example, a power profile can include information about the amount of power used in a given time period for text messages, emails, cellular telephone calls (e.g., when the electronic device is a smart telephone), internet browsing, camera use, travel applications, other applications such as health monitoring applications (e.g., heart rate monitor), and so on.

A power profile can be created for each day of the week, or for each repeating activity or meeting that appears on a calendar program. Additionally or alternatively, a power profile can be produced for each regularly used application on the portable electronic device or on one or more locations frequented by the user. A power profile can be created to reserve power for an application or function to allow the electronic device to save power for that application on a particular day or days, a given time of day, or some other time period.

Figure 1:
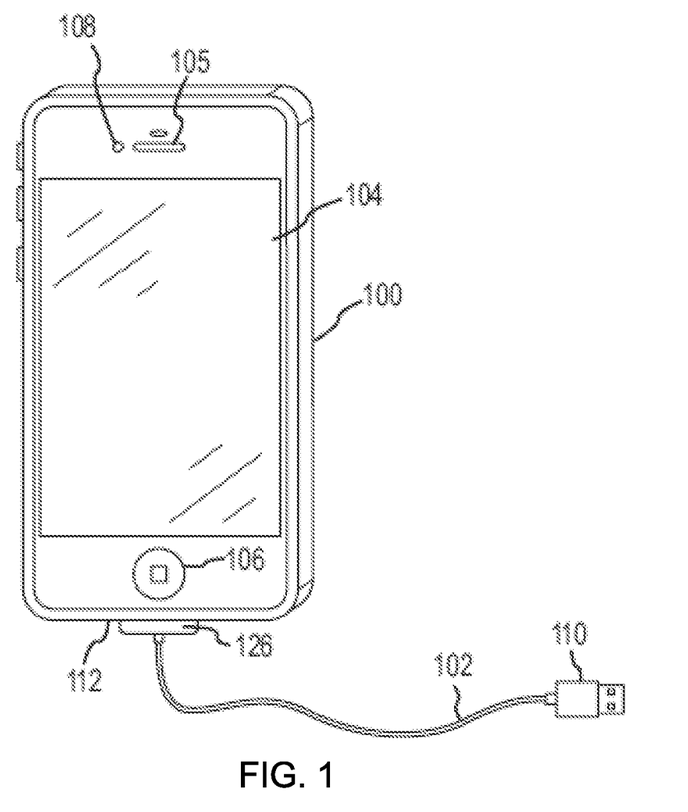
FIG. 1 is a perspective view of one example of a portable electronic device that includes an internal power source.
Figure 2:
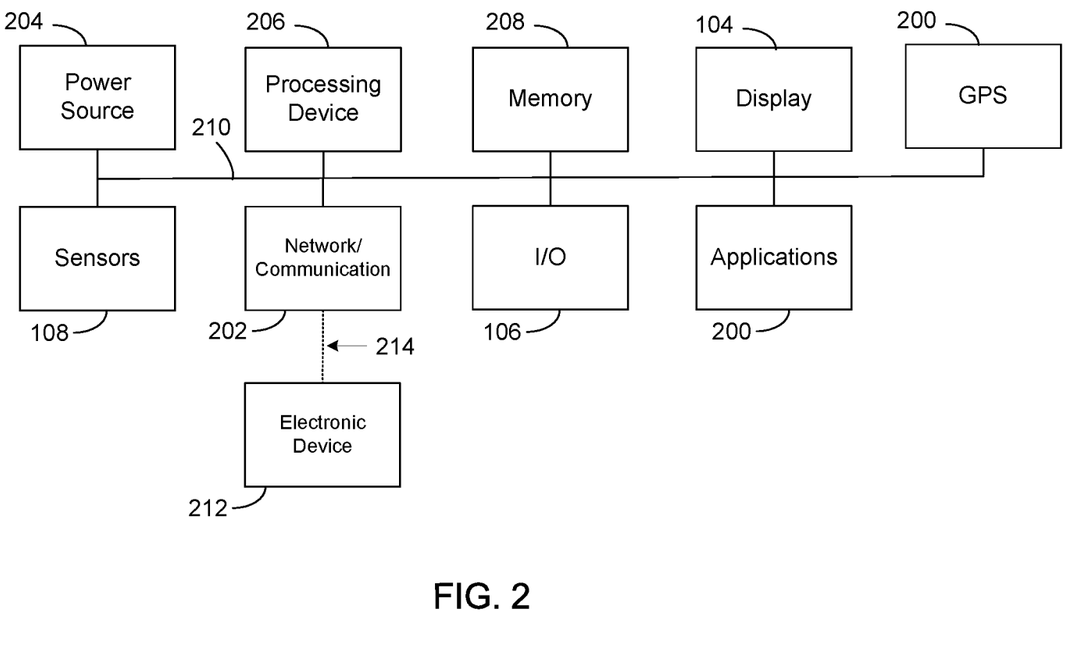
FIG. 2 is an example block diagram of the electronic device 100 shown in FIG. 1.

Turning now to the figures, the portable electronic device will be discussed in more detail. FIG. 1 is a perspective view of a portable electronic device 100 operably connected to a power cable 102. FIG. 2 is an example block diagram of the electronic device 100 shown in FIG. 1. With reference to FIGS. 1 and 2, the portable electronic device 100 may be substantially any type of electronic or computing device, including, but not limited to, a smart phone, a laptop or tablet computing device, a gaming device, a digital music player, a personal digital assistant, a remote control, a wearable computing device and/or display, and so on. In some embodiments, the portable electronic device 100 may include a display 104, an input member 106, an output member 105, one or more sensors 108, a global positioning system (GPS) mechanism 200 or receiver, a network/communication interface 202, an internal power source 204, a processing device 206, and/or a memory 208.

The display 104 may provide an image or video output for the portable electronic device 100. The display 104 may be substantially any size and may be positioned substantially anywhere on the electronic device 100. In some embodiments, the display 104 may be a liquid display screen, plasma screen, light emitting diode screen, and so on. The display 104 may further include one or more input sensors, e.g., capacitive touch screen, or infrared touch screen. In these embodiments, the display 104 may also provide input as well as output functions.

The input member 106 (which may be a switch, button, capacitive sensor, or other input mechanism) allows a user to interact with the portable electronic device 100. For example, the input member 106 may be a button or switch to alter the volume, return to a home screen, and the like. Additionally, the input member 106 may also provide haptic feedback or other haptic output for the portable electronic device 100.

The output member 105 may be combined with the input member 106 or may be separate therefrom. The output member 105 may provide output to the user from the portable electronic device 100. The portable electronic device 100 may include one or more input members 106 and/or output members 105, and each member 105, 106 may have a single input or output function or multiple input/output functions. Furthermore, in some embodiments, the input member 106 may be incorporated into the display 104, for example as a capacitive input for a capacitive touch screen.

The input port 112 may be formed within or defined by an enclosure of the portable electronic device 100 and may electrically connect an external device (e.g., headphones, speakers) or power source to one or more internal components of the mobile computing device 100. The input port 112 is configured to receive an electrical connector for the portable electronic device 100. For example, the input port 112 may be configured to receive the power cable 102, a data cable (e.g., universal serial bus, fiber optic, tip ring sleeve connector, and the like), or a combination data and power cable. The portable electronic device 100 may include more than one input port 112 and each input port 112 may be positioned substantially anywhere on the electronic device 100.

The power cable 102 may include two plugs 110, 126, one of which is located on each end of a cable 102. In some embodiments, a first plug 110 may be a different type of plug than the second plug 126. For example, the first plug 110 may be a USB plug whereas the second plug 126 may be a 30-pin connector plug. In other embodiments, the plugs 110, 126 may be substantially any type of plug or connector and may vary depending on the desired external power source and/or the configuration of the input port 112.

The first plug 110 may connect to one or more external power sources, such as, but not limited to, a wall outlet, a mobile charging outlet (e.g., 12V vehicle outlet), input or power port on a computer (e.g., USB port), and so on. As such, the first plug 110 may be modified depending on the desired charging source and/or may include one more adapters in order to best communicate with the desired power source. The second plug 126 may be configured to connect the cable 102 to the portable electronic device 100. As such, the second plug 126 may be configured to communicate with the input port 112 and may be modified as the input port 112 may be modified.

In other embodiments, the portable electronic device 100 may communicatively couple with one or more external power sources without the need for the power cable 102. For example, the portable electronic device 100 may receive power from an external power source inductively or wirelessly, or may include an integrated plug in lieu of the power cable. In these embodiments, the power cable 102 may be omitted.

The portable electronic device 100 may also include a sensor 108 positioned substantially anywhere on the portable electronic device 100. The sensor 108 may include a single sensor or multiple sensors. Additionally, the sensor 108 may be configured to sense substantially any type of characteristic, such as but not limited to, images, pressure, light, touch, heat, movement, relative motion, and so on. For example, the sensor 108 may be an image sensor, a heat sensor, a light or optical sensor, an accelerometer, a pressure transducer, a gyroscope, a magnet, one or more biosensors that monitor body functions such as blood pressure, pulse, and so on.

The network/communication interface 202 may be used to place phone calls from portable electronic device 100 (in embodiments where the portable electronic device 100 is a phone), may be used to receive data from a network, or may be used to send and transmit electronic signals via a wireless or wired connection (Internet, WiFi, Bluetooth, and Ethernet being a few examples). In some embodiments, the network/communication interface 202 may support multiple network or communication mechanisms. For example, the network/communication interface 202 may pair with another device over a Bluetooth network to transfer signals to the other device, while simultaneously receiving data from a WiFi or other network.

The applications 200 may be substantially any software application and/or a hardware component that operates in conjunction with a software application. For example, the applications 200 can include a map or navigation application that works in conjunction with a GPS mechanism, receiver, circuit, or sensor that may determine an approximate or exact location of the portable electronic device 100. For example, the GPS mechanism may, in communication with the network/communication interface 202, use network data (such as WiFi, cellular signals) to determine a location of the portable electronic device 100. In other embodiments, the GPS mechanism may be a GPS receiver that interacts with GPS satellites to determine the coordinates and location of the portable electronic device 100. Alternatively, a location can be determined using an IP address obtained from an internet web browser or email application.

Additionally or alternatively, the applications 200 can include a calendar program, a heath monitor software program that receives data from one or more biosensors sensors, a web browser application, an email application, a texting or instant message application, and so on. As will be described in more detail later, a user's use of one or more applications may be considered when estimating the power requirements of the power source 204 for an upcoming period of time.

The internal power source 204 may be substantially any type of member that may provide power to one or more components of the portable electronic device 100. However, in some embodiments, the power source 204 may be a rechargeable portable power source, such as one or more batteries. The power source 204 may be recharged or otherwise receive additional power from the power cable 102 when the power cable 102 is communicatively coupled to an external power source, such as a wall outlet, mobile charger, or the like. For example, in some embodiments, the power source 204 may be a rechargeable fast-charging battery or batteries. However, it should be noted that other types of power sources are envisioned as well.

In some embodiments, the power source 204 can include a two-stage standard charging battery that can use a fast charge to charge the power source to 80% capacity and then switch to a slow charge for the remaining 20%. In other embodiments, the power source 204 can be implemented as a fast-charging battery. A fast-charging battery can include control circuitry in the battery to rapidly charge the batteries without damaging the battery during recharge. In some embodiments, a fast-charging battery is a battery with a charge rate that is greater than 1c, where charging at 1c means charging at 1× the charge capacity of the battery. Thus, the fast-charging battery can recharge faster than standard charging batteries by recharging at a rate that is greater than 1× the charge capacity of the fast-charging battery.

Figure 3:
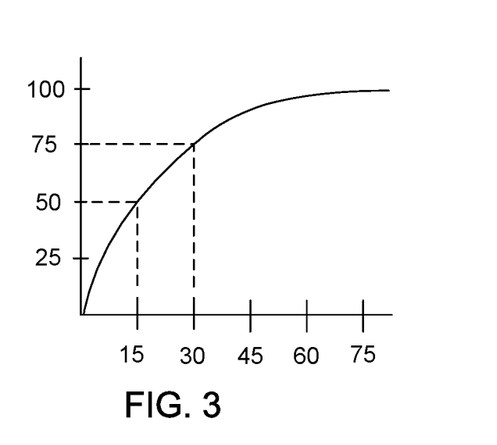
FIG. 3 depicts an example graph of a charge state versus an amount of time for a fast-charging battery.

FIG. 3 depicts an example graph of a charge state versus an amount of time for a fast-charging battery. In the illustrated embodiment, the battery is recharged to approximately fifty percent after fifteen minutes of recharging, and is recharged to approximately seventy-five percent after thirty minutes of recharging. Thus, a user can obtain a majority amount of charge on the battery in a relatively short period of time (e.g., 15 to 30 minutes). A user may obtain a sufficient amount of power on the battery to meet the user's needs for an upcoming period of time in 15 or 20 minutes of recharging. For example, depending on the power remaining on the battery, a user can recharge the battery while eating breakfast and obtain a sufficient amount of power to meet the power requirements for an entire day.

Returning to FIG. 2, the processing device 206 may control operation of the portable electronic device 100. The processing device 206 may be in communication, either directly or indirectly, with substantially all of the components of the portable electronic device 100. For example, one or more system buses 210 or other communication mechanisms may provide communication between the processing device 206, the display 104, the output member 105, the input member 106, the sensors 108, and so on. The processing device 206 may be any electronic device cable of processing, receiving, and/or transmitting instructions. For example, the processing device 206 may be a microprocessor or a microcomputer.

The memory 208 may store electronic data that may be utilized by the portable electronic device 100. For example, the memory 208 may store electrical data or content corresponding to various applications or components. For example, the memory 208 can store audio files, video files, document files, power profiles, estimated power requirements, and so on, corresponding to various applications. The memory 208 may be, for example, non-volatile storage, a magnetic storage medium, optical storage medium, magneto-optical storage medium, read only memory, random access memory, erasable programmable memory, or flash memory.

The network/communication interface 202 may connect the electronic device to another external electronic device 212 using a wired and/or wireless network connection 214, or through other suitable communication mechanism, such as touching two devices to each other (e.g., using near field communication). The external electronic device 212 can be a computing device, a server, and/or a storage device. As one example, the external device 212 can be a laptop computer or a smart telephone. Embodiments described herein may store power profiles, estimated power requirements, and other information about the portable electronic device, and/or associated power use in the external electronic device 212. The portable electronic device can then access the information when needed.

Embodiments described herein can estimate or predict the power requirements for an electronic device for an upcoming period of time. Information about the remaining use time of the electronic device based on the estimated power requirements and the remaining supply of power on the internal power source can then be provided to the user in a more meaningful display. For example, a processing device in an electronic device may correlate the power usage to one or more entries in a calendar application, and determine the power used during particular or repeating meetings and activities. This learned information can then be used to estimate the power requirements for power source over an upcoming or future period of time.

Embodiments can provide an indication of how much use remains on the internal power source based on a power profile the device has created or received. The power profile can include estimated power requirements, historical power usage, and/or options regarding the power management of the portable electronic device. For example, a power profile can include information about the amount of power used in a given time period for text messages, emails, cellular telephone calls (e.g., when the electronic device is a smart telephone), Internet browsing, camera use, travel applications, other applications such as health monitoring applications (e.g., heart rate monitor), and so on. In some embodiments, one or more processing devices can produce and/or modify an estimated power requirement based on one or more power profiles and/or user input.

Figure 4:
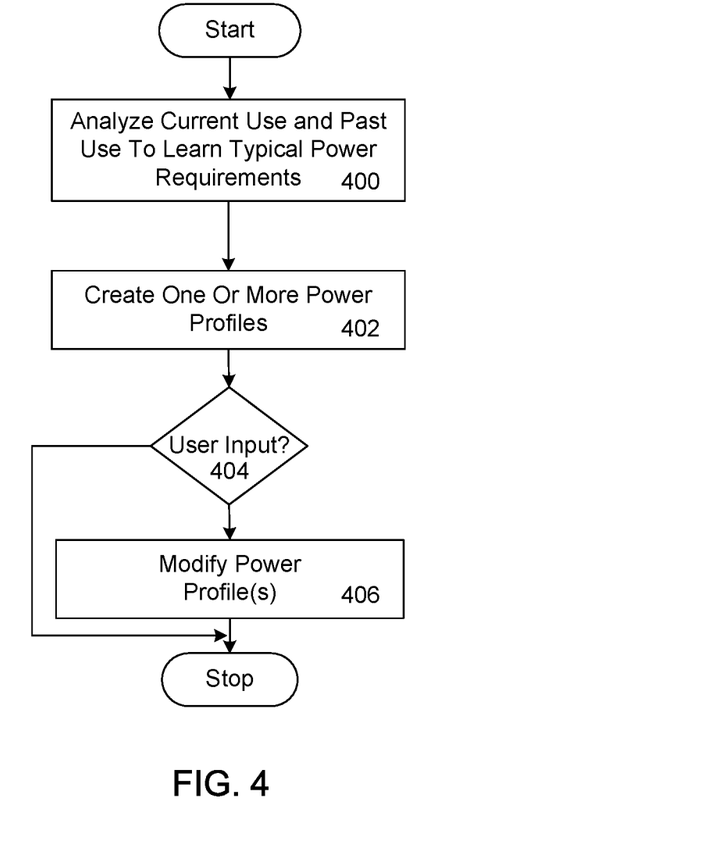
FIG. 4 is a flowchart illustrating an example method for creating one or more power profiles.

Referring now to FIG. 4, there is shown a flowchart illustrating an example method for creating one or more power profiles. Initially, a processing device can analyze the current uses of an electronic device and/or historical power uses of the electronic device (block 400). The portable electronic device can sample data regarding power usage over time to create a database of power use data, or the mobile device may have a "test" time such as a number of days or a week during which the device may store data corresponding to the "typical" power consumption.

Next, as shown in block 402, the processing device can create one or more power profiles that are associated with a user and/or with the portable electronic device. For example, a power profile can be created for each day of the week, or for each repeating activity or meeting that appears on a calendar program. Additionally or alternatively, a power profile can be produced for each regularly used application on the portable electronic device or on one or more locations frequented by the user. A power profile can be created to reserve power for an application or function to allow the electronic device to save power for that application on a particular day or days, a given time of day, or some other time period.

A determination is then made at block 404 as to whether or not user input is received that impacts one or more power profiles. For example, a user may prioritize the applications on the electronic device. Additionally or alternatively, a user can specify the electronic device enter a low power mode when the remaining power on the internal power source reaches a certain level. The user can specify what applications and functions to turn off and which applications and functions should run in the lower power mode. In some embodiments, a user can require a certain amount of power be reserved for some applications or functions. For example, a user may commute to and from work using a commuter train and enter or scan a monthly pass for the train using the electronic device. That user can require power be reserved each workday for scanning the monthly pass twice each day.

If user input has not been received regarding the power usage of the electronic device, the method ends. If user input has been received, one or more power profiles that are affected by the user input can be modified at block 406 and the method ends. In another embodiment, block 404 can be omitted and a power profile may be created at block 406 when an existing power profile is not affected by the user input.

Figure 5:
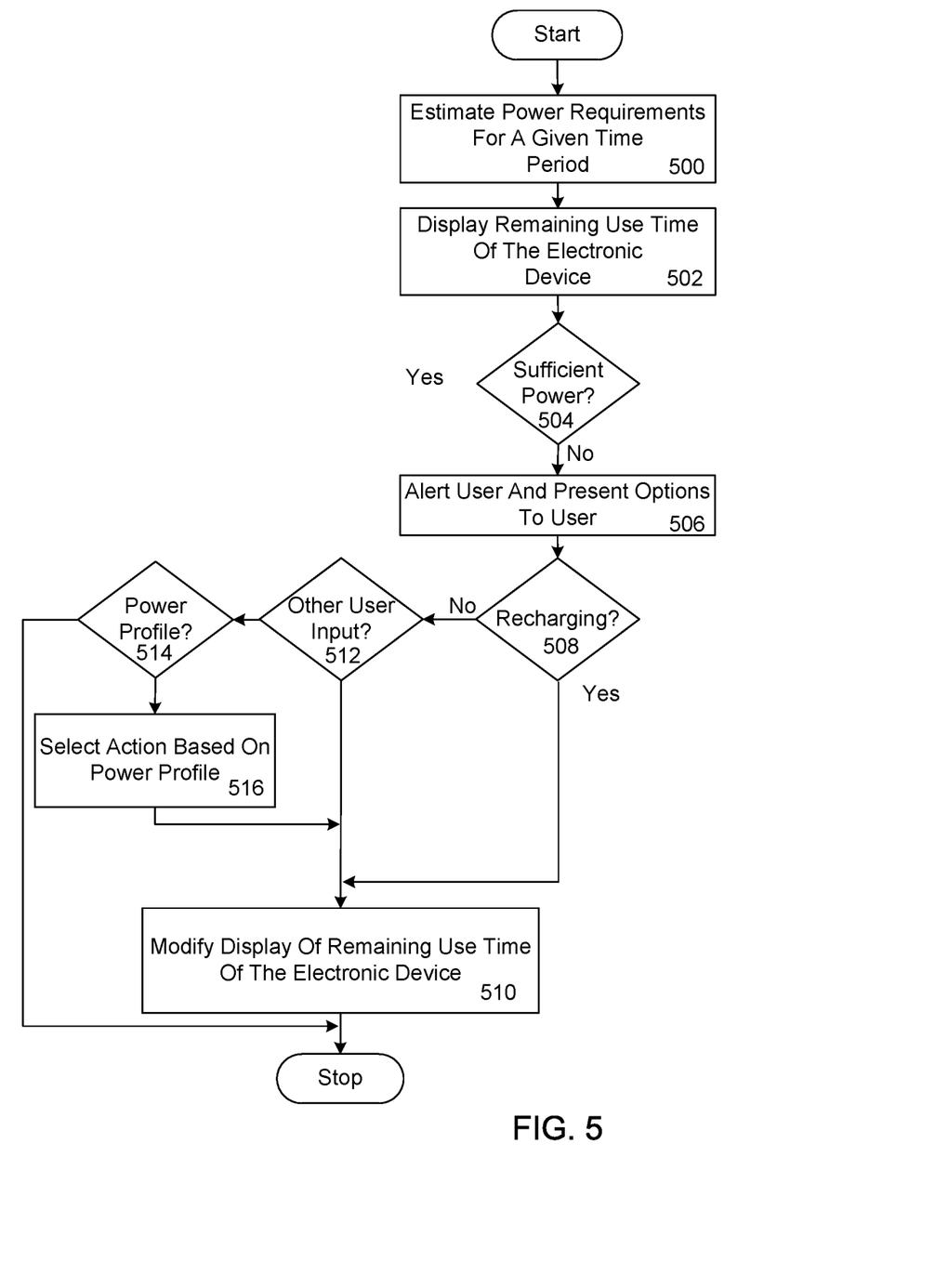
FIG. 5 is a flowchart depicting an example method for displaying remaining power on an internal power source in a portable electronic device.

FIG. 5 is a flowchart depicting an example method for displaying the remaining use time on an internal power source in a portable electronic device. Methods for displaying the remaining use time can be performed continuously, periodically, or at select times. The method may begin at block 500 with the portable electronic device estimating or predicting the power requirements for the electronic device during an upcoming time period. The time period can be a certain period of time, or the time period can be the time left until the internal power source runs out of power. The estimated power requirements can be included in a power profile that is associated with the user and/or with the electronic device.

One factor that may be considered when performing block 500 is data from, or related to, one or more applications or other software programs a user is expected to use in the given time period. As a first example, the electronic device can analyze a calendar application to determine the location and/or number of meetings and/or appointments that the user may be attending to predict the use of the electronic device by the user.

As another example, the portable electronic device may predict that the user will want navigation or turn by turn directions for five hours while he or she is traveling to a destination. In this example, the user may have used an application to request directions from one location to the destination. Providing turn-by-turn directions means the portable electronic device will be in near-constant or constant use during the five hours of travel. Example factors that can be considered when estimating the power requirements for an upcoming time period are described in more detail in conjunction with FIG. 6.

Next, as shown in block 502, an amount of remaining use time for the electronic device is then displayed based on the estimated power requirements and a state of charge on the internal power source. Example embodiments of displayed information are described in conjunction with FIGS. 7 and 8. A determination is then made at block 504 as to whether or not a sufficient amount of power is left on the internal power source to meet the predicted power requirements. If so, the process returns to block 500.

When the internal power source does not have a sufficient amount of power to meet the predicted power requirements, the method continues at block 506 where the user is alerted and can be provided with one or more options regarding the power management of the electronic device. The user alert can take the form of a recommendation to recharge the internal power source. Additionally or alternatively, the portable electronic device may present options to the user regarding adjusting one more characteristics of the electronic device in order to prolong the power on the internal power source. For example, one option may be to place the portable electronic device in a low power state where the portable electronic device performs only basic functions. In some embodiments, a user can specify the portable electronic device reserve power for selected upcoming applications that will be performed while in the low power state. Alternatively, the user can opt to place the device in a sleep mode.

A determination is then made at block 508 as to whether the internal power source is being recharged. If so, the display of the remaining use time of the electronic device can be updated at block 510 and the method ends. As described earlier, in some embodiments, the internal power source is a fast-charging rechargeable battery that can receive a relatively substantial amount of charge in a short period of time.

If the internal power source is not being recharged, the process passes to block 512 where a determination can be made as to whether any user input has been received regarding the power management of the portable electronic device. By way of example only, the user may have specified the electronic device be placed in a low power or sleep state. As another example, a user can specify that one or more applications be disabled until the internal power source is recharged. If user input is received, the display of the remaining use time of the electronic device can be updated at block 510.

If user input is not received, the method continues at block 514 where a determination is made as to whether one or more power profiles are to be reviewed. The method ends if a power profile will not be accessed. If at least one power profile is to be accessed, one or more actions can be taken based on at least one entry in the power profile(s). In some embodiments, one or more options can be included in a power profile that is associated with the user and/or with the portable electronic device. A power profile can allow the electronic device to activate options automatically. Alternatively, some of the options can be performed automatically while other options can be input or selected by a user.

The power profile can include estimated power requirements and/or historical power usage. The estimated power requirements and historical power requirements can be categorized in several ways, such as, for example, by applications, by days of the week, by hours of the day, by entries in a calendar, by location, and by travel (individually and/or in various combinations). Embodiments can include other suitable categories in a power profile.

One or more settings, characteristics, applications, and/or components may be adjusted based on a power profile. For example, the electronic device may adjust a data polling rate for an email application, a brightness of a display, turn off certain sensors (e.g., accelerometer, GPS mechanism, or the like), deactivate certain applications (e.g., game applications or applications that run any background processes), and so on. The actions that may be taken by a processing device may vary based on the desired reduction in power usage for the portable electronic device, input received from a user, and/or based on the power profile. For example, certain users may prefer to reduce or turn off data polling for email applications, whereas other users may prefer to deactivate GPS functions, telephone calls, text messages, image capture functions and the like. Certain embodiments may permit users to specify any or all functionality, separately or in groups, to deactivate in order to prolong an amount of use time for an electronic device.

Further, some embodiments may permit a user to define different tiers or levels of functionality to deactivate. That is, when the device's charge reaches a first threshold, a first set of user-specified functions may be terminated. As a second threshold, a second set of user-specified functions may be deactivated, and so on. The second set of functions may overlap, complement or replace the first set of functions. That is, when the second set of functions is deactivated, some embodiments may permit a function previously deactivated to be re-activated. Further, some embodiments may provide a user interface that not only permits the specification of tiers in this fashion, but also shows the relative decrease in power requirements as functions, applications, characteristics and the like are activated or deactivated. In this manner, the device may inform a user of the particular power savings and/or extended amount of use time for each tier or set the user creates, thereby facilitating the creation of multiple tiers of deactivated functions, each of which conserves more power than the prior tier. Indeed, certain embodiments may require successive tiers to each preserve more power than the prior tier.

Figure 6:
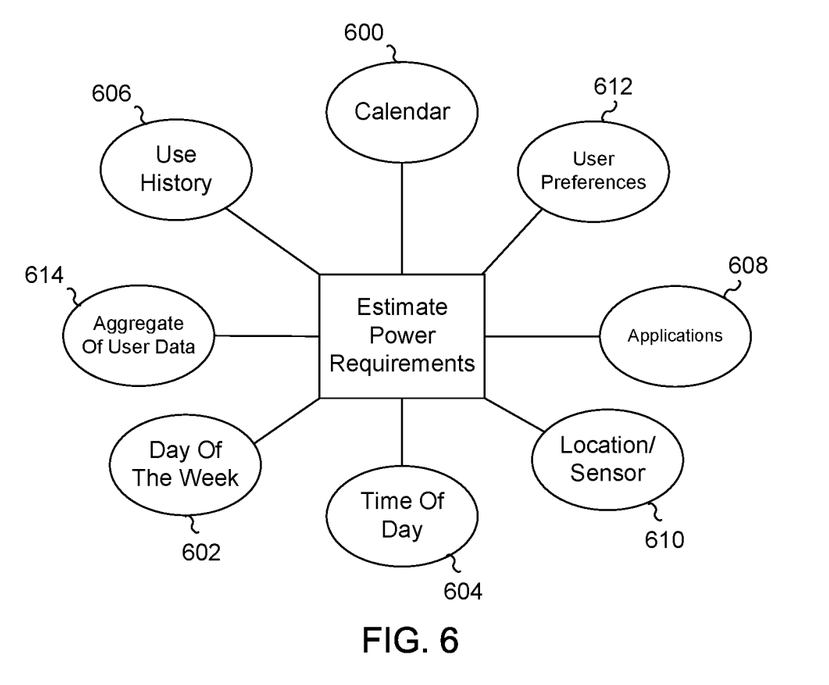
FIG. 6 is a conceptual diagram of example factors that can be considered when performing block 500 in FIG. 5.

FIG. 6 is a conceptual diagram of example factors that may be considered when performing block 500 in FIG. 5. As described previously, entries in a calendar application 600 can be accessed and used to estimate or predict the power requirements for an upcoming time period. As another example, the electronic device can determine that a certain amount of power is used during a particular meeting. So when the electronic device accesses the calendar and that meeting occurs during the time period the electronic device is estimating power requirements, the electronic device can include the power used during the meeting in the estimate. Alternatively, the electronic device can determine the user is in a meeting and, based on prior power use during the same meeting or during select or all meetings, include a certain amount of power use and/or an average amount of power use in the estimate.

Similarly, the day of the week 602 and/or the time of day 604 can be considered when estimating upcoming power requirements. For example, a user may have a recurring activity on every Monday and the electronic device has determined that the activity uses a given amount of power. The amount of power can be an average of the power use over a period of Mondays, or the amount of power can be the actual amount of time used most recently.

Additionally or alternatively, the electronic device may have determined that the user's power use after 7 pm drops to a given amount of power. As another example, a user's power use on Fridays between 9 am and 12 pm can be included in the power estimation.

A user's past or historical power use 606 can be considered when estimating the power requirements for an upcoming time period. The historical power use can be based on the applications 608 and how much power each application used over a time period. Alternatively, the past power use can be based on average power used in the past during each hour of a particular day 602. Thus, a user may use a first amount of power between 9 and 10 am on Saturdays and a different second amount of power between 10 and 11 am on Saturdays.

The location 610 of a user and/or data from one or more sensors may be considered when predicting the power requirements for an upcoming period. Using a global positioning system (GPS) or other navigation system the electronic device can determine a user requested directions to a specific location and can calculate an amount of time remaining before the user arrives at that location. Thus, the electronic device can determine a power requirement needed to run the navigation program until the user arrives at the specific location.

As another example, the electronic device can determine a user is at a health club based on the location of the user. Additionally or alternatively, the electronic device may determine that the user is currently running a health monitoring program, such as a heart rate monitor. Based on the user's previous power requirements with the health monitoring program, the electronic device can estimate the power requirements for the user's current use of the health monitoring program.

A user's preferences 612 may be considered when estimating power requirements. A user can specify power be reserved for one or more activities, applications, calendar entries, time of day. As one example, a user may commute to and from work using a light-rail or commuter train. A user can specify that power be reserved for scanning a monthly pass or ticket twice a day each work day. Additionally or alternatively, a user can prioritize his or her use of applications so the electronic device can allocate power to applications having a higher priority than applications with a lower priority. For example, a user can give a higher priority to email and text message applications and a lower priority to games and a camera application. The electronic device can allocate or reserve power for email and texting when the predicted or actual use time remaining on a power source is less than an estimated power requirement.

An aggregate of data relating to the power use of a group of users can be used to estimate the power requirements for an upcoming time period. For example, the electronic device can determine that a group of users running a particular application use a given amount of power in a time period. As another example, users that have a similar type of schedule tend to use a given amount of power.

Figure 7:
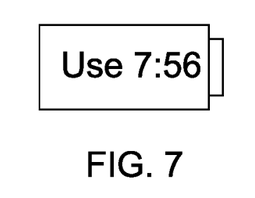
FIG. 7 is one example of a display for displaying the remaining use time for an electronic device.
Figure 8:
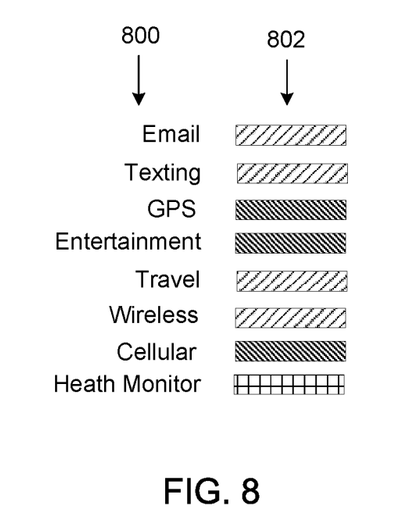
FIG. 8 is another example of a display for displaying the remaining use time for an electronic device.

Referring now to FIGS. 7 and 8, there are shown example displays of the remaining use time for an electronic device that can be displayed to a user. The display can be a simple display that provides information about the remaining use time of an electronic device. The information can be actual time data, expressed in hours and/or minutes. An example of this type of displayed information is illustrated in FIG. 7.

In other embodiments, a more advanced display can be provided, such as the example shown in FIG. 8. The display can include one or more applications arranged in a list 800 and information 802 representing the amount of remaining use time can be displayed next to each application. The applications in the list can be specified by the user, can include the applications most used by the user, and/or can include the most power consuming applications. Additionally, the list can include any applications in which the user has reserved power for that application. The applications in the list can be represented with icons, with text, and/or with user-input abbreviations.

The information 802 regarding the remaining use time for each application in the list 800 can be presented in several ways. In one embodiment, the information 802 can include amounts of time expressed in hours and/or minutes. In another embodiment, the information can be color-coded graphical representations such as a green, yellow, or red box or other shaped representation. In other embodiments, the information 802 can be different graphical shapes, such as a checkmark, a hyphen, a question mark, an asterisk, an exclamation mark, and/or up or down arrows. Alternatively, the information 802 can be a smiley face that represents a sufficient amount of remaining use time and a sad face representing insufficient remaining use time. The sufficiency of the amount of remaining use time can be based on the predicted power requirements for each application for an upcoming time period and a state of charge on the internal power source.

In some embodiments, the power profiles, the user inputs, and/or data regarding historical power requirements can be stored on an external device (e.g., electronic device 212 in FIG. 2) that can be connected to the portable electronic device. The portable device can estimate the power requirements for an upcoming time period by accessing the data. Similarly, the process of estimating the power requirements and configuring the displayed information can be performed by the external device. The estimated power requirements and/or the displayed remaining use time can then be transmitted to the portable electronic device.

Various embodiments have been described in detail with particular reference to certain features thereof, but it will be understood that variations and modifications can be effected within the spirit and scope of the disclosure. The foregoing description has broad application. For example, although the electronic device has been described as a mobile electronic device, the devices and techniques disclosed herein are equally applicable to other types of devices. Accordingly, the discussion of any embodiment is meant only to be exemplary and is not intended to suggest that the scope of the disclosure, including the claims, is limited to these examples.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. A processing device for managing power consumption, the processing device configured to:
   - analyze a historical use of the processing device to determine a first amount of power used by the processing device during a number of repeating processes executed by the processing device;
   - during an upcoming time period, determine a power requirement required by the processing device to perform one or more upcoming processes, the one or more upcoming processes corresponding to at least one repeating process of the number of repeating processes;
   - determine whether a second amount of power accessible by the processing device through a power supply is sufficient to satisfy the power requirement; and
   - in accordance with determining that the second amount of power is insufficient to satisfy the power requirement, change a priority of the one or more upcoming processes to allocate or reserve power for at least one process of the one or more upcoming processes, the at least one process of the one or more upcoming processes being performed in accordance with the processing device executing processes for at least one application during the upcoming time period.

2. The processing device of claim 1, further configured to:
   - create multiple profiles, each profile of the multiple profiles associated with a respective repeating process of the number of repeating processes and associated with a setting of the processing device; and
   - select a profile of the multiple profiles based, at least in part, on the power requirement.

3. The processing device of claim 2, wherein each profile of the multiple profiles is assigned to a respective day of a week.

4. The processing device of claim 2, wherein each profile of the multiple profiles is assigned to a particular time of a day.

5. The processing device of claim 1, wherein, in accordance with changing the priority of the one or more upcoming processes, one or more settings of the processing device are adjusted to reduce power consumption of the processing device.

6. The processing device of claim 1, further comprising, in accordance with determining that the second amount of power is insufficient to satisfy the power requirement, deactivating one or more processes of the one or more upcoming processes.

7. The processing device of claim 1, wherein the at least one application is at least one of an email application, a texting application, a global positioning system (GPS) application, an entertainment application, a travel application, a wireless application, a cellular application, or a health monitor application.

8. A method for managing power consumption, the method comprising:
   - analyzing a historical use of a processing device to determine an amount of power used by the processing device during a number of repeating processes executed by the processing device;

determining a power requirement required by the processing device to perform one or more upcoming processes corresponding to at least one repeating process of the number of repeating processes; and based on the power requirement and the amount of power used during the number of repeating processes, changing a priority of the one or more upcoming processes to allocate or reserve power with respect to the processing device, at least one process of the one or more upcoming processes being performed in accordance with the processing device executing processes for at least one application.

9. The method of claim 8, wherein the number of repeating processes are previously executed with respect to one or more applications executed on an electronic device associated with the processing device.

10. The method of claim 9, wherein the one or more applications include at least one of an email application, a texting application, a global positioning system (GPS) application, an entertainment application, a travel application, a wireless application, a cellular application, or a health monitor application.

11. The method of claim 8, further comprising determining whether a second amount of power accessible by the processing device through a power supply is sufficient to satisfy the power requirement, wherein changing the priority of the one or more upcoming processes is performed in accordance with determining that the second amount of power is insufficient to satisfy the power requirement.

12. The method of claim 8, wherein the amount of power used by the processing device during the number of repeating processes is further based on at least one of a setting of an electronic device, one or more applications, a location of the processing device, a time of day, a day of a week, an aggregate of user data, or a calendar.

13. The method of claim 8, further comprising reverting the priority of the one or more upcoming processes to an original priority in response to detecting that the processing device is coupled with a power supply.

14. The method of claim 8, wherein changing the priority of the one or more upcoming processes reserves power for the processing device at a predetermined time of a day.

15. The method of claim 8, wherein the one or more upcoming processes are suspended during a period when the historical use indicates that a low number of processes will be performed on the processing device.

16. A processor of an electronic device, the processor configured to:

analyze a historical use of the electronic device to determine a first amount of power used by the processor during a number of repeating processes executed by the processor;

based on the historical use, determine a historical amount of power used by the electronic device during execution of one or more applications on the electronic device;

using the historical amount of power used by the electronic device during execution of the one or more applications on the electronic device, determine a power requirement required by the electronic to perform one or more upcoming processes corresponding to the one or more applications in an upcoming time period;

determine whether a second amount of power accessible by the electronic device through a battery is sufficient to satisfy the power requirement; and in accordance with determining that the second amount of power is insufficient to satisfy the power requirement, reserve power for at least one application of the one or more applications during the upcoming time period.

17. The processor of claim 16, wherein:
the electronic device comprises a display; and
the processor causes display of a time use remaining indicator on the display.

18. The processor of claim 17, wherein the time use remaining indicator is reset in accordance with coupling the electronic device to a power source, the power source configured to recharge the battery.

19. The processor of claim 16, wherein:
the upcoming time period is a repeating time period; and
the repeating time period is identified in accordance with a calendar of a user of the electronic device.

20. The processor of claim 16, wherein reserving power for the at least one application comprises reducing a processing power of the processor.

* * * * *